P. BLUM.
MACHINE FOR PORTIONING OFF DOUGHY OR GRANULAR MATERIAL.
APPLICATION FILED OCT. 20, 1919.
1,431,718.
Patented Oct. 10, 1922.
3 SHEETS—SHEET 1.
Fig. 1.
Fig. 2.
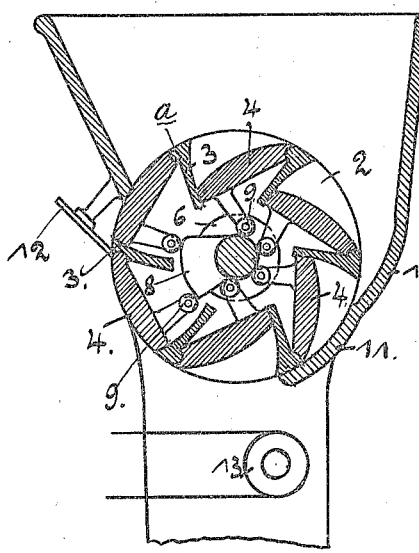
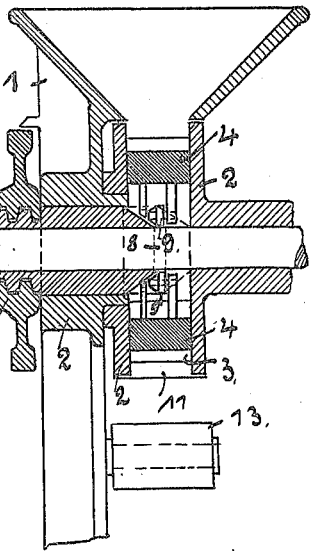
Witnesses
Inventor
Peter Blum P. BLUM.
MACHINE FOR PORTIONING OFF DOUGHY OR GRANULAR MATERIAL.
APPLICATION FILED OCT. 20, 1919.
1,431,718.
Patented Oct. 10, 1922.
3 SHEETS—SHEET 2.
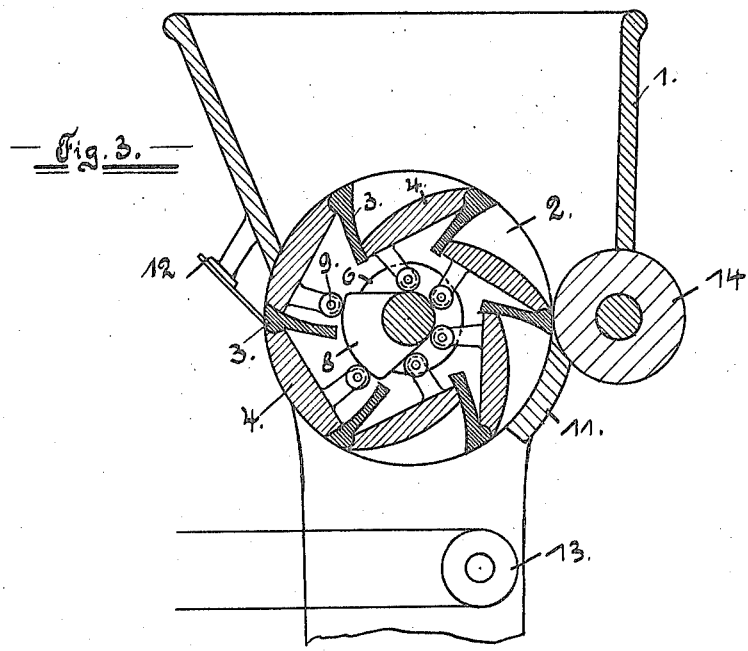
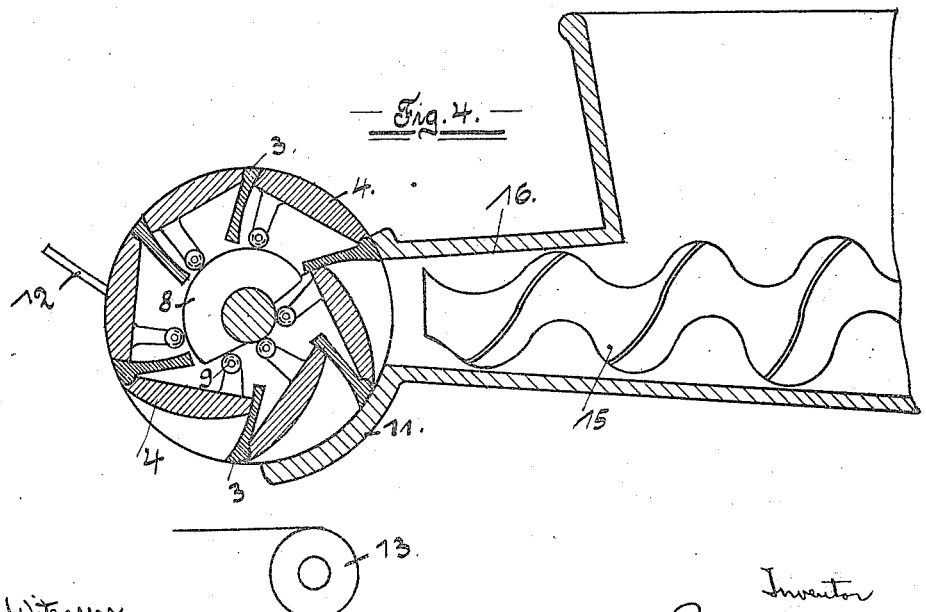

P. BLUM.
MACHINE FOR PORTIONING OFF DOUGHY OR GRANULAR MATERIAL.
APPLICATION FILED OCT. 20, 1919.

1,431,718.

Patented Oct. 10, 1922.

Patented Oct. 10, 1922.

1,431,718

UNITED STATES PATENT OFFICE.

PETER BLUM, OF HALLE-ON-THE-SAALE, GERMANY.

MACHINE FOR PORTIONING OFF DOUGHY OR GRANULAR MATERIAL.

Application filed October 20, 1919. Serial No. 331,993.

*To all whom it may concern:*

Be it known that I, PETER BLUM, a citizen of the German Republic, and residing at 14 Bismarckstrasse, Halle-on-the-Saale, Germany, have invented certain new and useful Improvements in a Machine for Portioning off Doughy or Granular Material (for which I have filed application in Germany Oct. 7, 1918), of which the following is a statement.

In existing machines of the type which includes cylinders provided with chambers in which the material is portioned or measured and from which it is ejected by means of plungers, it is possible to utilize, at a maximum, only about one-third of the surface of the cylinder for such portioning or measuring chambers. Furthermore, in such machines and in machines in which the portioning chambers are formed by means of blades emerging from a cylinder, it is impossible, to fill the corner formed by the front wall of such portioning chambers and the bottom completely with the dough to be portioned. In such machines this unfilled corner therefore will result in cavities of varying size in the dough and therefore cause an inaccurate and unequal portioning. Besides it is difficult to properly clean such machines. In machines with blades which recede into the cylinder the fine film of dough adhering to the said blades will be partly carried along by the latter, and when the guides for said blades are short, the dough will, as the blades again emerge, be partly stripped off onto the inner surface of the cylinder; in such case, after the machine has been in use for a long time this dough will work its way into the blade operating gear. The cleaning of the latter thereby necessitated is very tedious and can only be performed by opening the cylinder at the side. When the blade guides are very long, the fine dough film is partly deposited in the guides and the movement of the blades will be difficult, whereby stoppages are caused.

It is the object of the present invention to obviate these difficulties. The shell of the portioning cylinder according to the present invention is composed of fixed and movable ring sections, the latter being arranged to pivot between the former. By rocking these movable sections away from the cylindrical line wedge-shaped portioning chambers are formed. In consequence of this new shape of the portioning chambers up to $\frac{6}{7}$ of the surface of the portioning cylinder may be utilized for portioning chambers.

The hereinbefore mentioned objectionable corners are avoided by the new, wedge-shaped form of the portioning chambers and because the latter have their apices pointing in the direction of rotation. The novel arrangement for displacing the bottoms of the portioning chambers for adjusting the capacity of said chambers by means of a cone allows of at one time holding a larger number of such chambers fully open. This is of particular advantage for filling the said chambers in machines with a hopper tapering downwards.

In the accompanying drawing in which four different modifications of the present invention are exemplified, Fig. 1 is a vertical section of one form of my improved machine; Fig. 2 is a vertical section thereof looking in a direction at right angles to that of Fig. 1.

Fig. 3 is a longitudinal section through the same machine illustrating a roller for closing the hopper.

Fig. 4 is a longitudinal section through a machine provided with an intermittently revolving cylinder and a dough conveyor.

Figure 5:
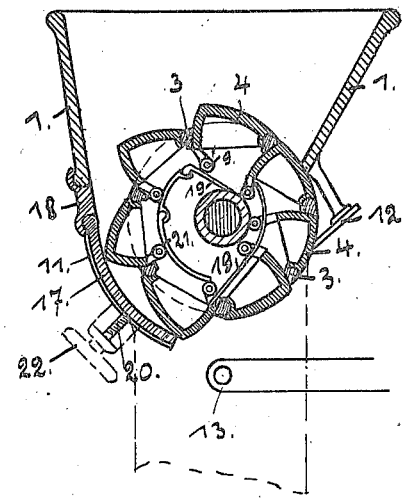
Fig. 5 is a view similar to Fig. 1, but illustrating a different form of portioning cylinder.

In the machine shown in Figs. 1 and 2 the hopper is attached to the main body 1 of the machine. A shaft 5 is journalled in said hopper and carries an axially displaceable sleeve 6, which is fitted into a boss of the body 1. On this boss is journalled the left end disk 2 of the portioning cylinder, whilst the other, right end disk of said cylinder is revolubly journalled on the shaft 5. The two disks 2 form a portioning cylinder and are connected by webs or ring-sections 3 whereby pockets or chambers are formed in the periphery of said portioning cylinder, the bottoms of said pockets or chambers being closed by pivotally mounted members or ring-sections 4. The said portioning cylinder 2 is rotated by means of a crank, belt-pulley or the like coupled to the right end-disk. The one side of each ring-section 3 is provided with a cylindrical bead, whilst the other side of said ring-section 3 is of a curved form having the bead of the next adjacent section 3 as a centre. The ring-sections 4 are so formed at one end as to pivot on the said cylindrical beads, whilst at their opposite ends they are curved to fit the curved surfaces of the ring-sections 3 upon which said ring-sections 4 are adapted to travel and which serve as guides therefor. With this arrangement of the said ring-sections the portioning chambers are formed as previously stated, it being understood that by adjusting the ring-sections 4 to various distances from the periphery of the cylinder the various required capacities of the portioning chambers may be obtained.

As shown at a point in close proximity to the stripper 12 in Fig. 1, the location of the beads and recesses whereby the ring-sections 4 are pivotally mounted may be reversed, the ring-sections 4 in such case being fitted with a bead and the ring-sections 3 with a corresponding recess, or both may be provided with recesses and journaled on a cylindrical stud, as indicated by dotted lines *a* in Fig. 1.

The ring-sections 4 are provided with guide rollers 9 which may be journalled in a yoke carried by said ring-sections 4, said guide rollers being arranged to ride on a cam 8. The said guide-rollers are, further provided at one end with conical extensions adapted to ride upon the correspondingly inclined surface of the tapering end of the sleeve 6. In this tapering end of the sleeve 6 a recess is cut to correspond with the cam 8, so that, when the said sleeve is axially displaced by means of an internally screw-threaded handwheel 7 and an external screw thread formed on said sleeve, the said tapering end may be moved beyond and relatively to the cam 8 to the right in Fig. 2. By means of such adjustment of the tapering end of sleeve 6 the stroke of the guide rollers 9 and consequently of the ring-section 4 which are attached thereto may be varied, and the capacity of the portioning chambers thereby adjusted at will.

The hopper is slighly contracted at 10, and at this point is provided with an extension plate 11 for closing the portioning chambers, this extension plate is of such dimensions and so arranged with respect to the peripheral dimensions of the portioning chambers as to completely cut off communication between each successive chamber and the hopper before any part of said chamber passes beyond said plate 11. With this arrangement, concurrent communication between the interior of said hopper and the individual chambers and between the latter and the exterior of said hopper is thus prevented and the possibility of any of the contents being forced from the chambers by the weight of the material remaining in the hopper or back into the latter, for instance by the action of the ring-sections 4, as might be the case if said chambers or pockets communicated coincidentally with the hopper and the exterior of the machine, is positively avoided.

In Fig. 3 the same machine is shown fitted with a closing roller 14 in combination with a plate 11; this closing roller 14 is arranged to force the dough into the portioning chambers. The said roller 14 may be driven by means of friction from the cylinder 2, or directly from the main drive and uniformly with the cylinder, or at a greater or slower speed than the latter, as may be found desirable.

In Fig. 4 the portioning cylinder is shown in operative combination with a worm press, it being understood that a plunger may be employed in place of said worm press. The ring-section 4 which at the moment happens to be in front of the mouth of the press will be forced into the cylinder by dough forced out of the press.

Figure 6:
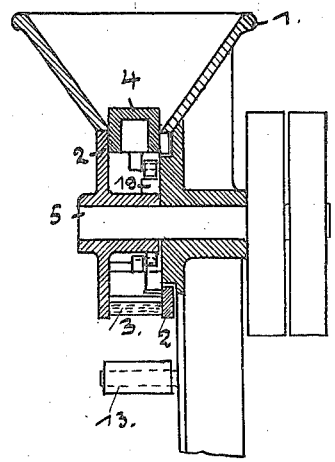
Fig. 6 is a vertical section thereof looking in a direction at right angles to that of Fig. 5.

Figs. 5 and 6 illustrate modifications in which in contradistinction to the form shown in Figs. 1 to 4, the ring sections are movable outwardly relatively to the periphery of the portioning cylinder 2 and form the portioning chamber in co-operation with the extension plate 11 of the hopper.

The ring-sections 4 are moved adjusted relatively to the cylinder by means of fixed rails 19 and are guided on adjustable guide rails 21.

Figure 7:
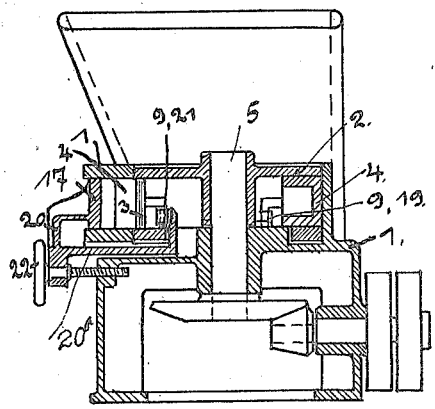
Figs. 7 and 8 show the same machine with the portioning cylinder disposed in a horizontal line.
Figure 8:
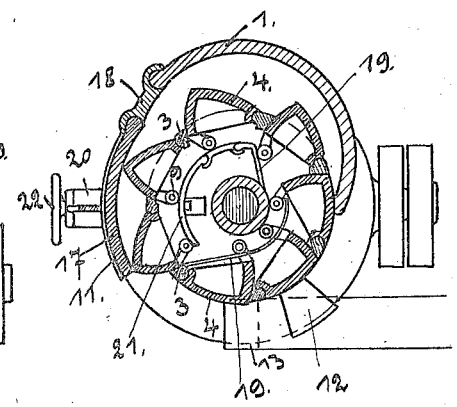

For varying the size of the portioning chambers the wall 17 which, in this form, constitutes the extension plate 11 is provided with a hinge 18, so that it pivotally may be adjusted by means of a slide attached to a yoke 20 as shown in Fig. 7, said slide moving in the main body 1 and being displaced by means of a handwheel 22 and a screw spindle connected therewith. To the other end of said slide is fitted an arm 20ª which extends through a hole in the main body into the cylinder and is there coupled to the guide rail 21, the latter being operatively coupled by means of a link to the fixed rail 19. The wall 17 and the guide bar 21 are rigidly coupled by means of the yoke 20ª and slide 20, so that by each adjustment of the wall 17 the guide rail 21 will be adjusted also, and the distance between the said two parts will always remain the same. When the wall 17 is displaced towards the guide rail 21 in the direction of the axis of rotation, the portioning chambers will become smaller, as the ring-sections will emerge less from the cylinder. The hinge 18 for the wall 17, and also the hinge between the movable guide bar 21 coupled thereto and the fixed bar 19 may consist of a cylindrical recess on the one part and a corresponding cylindrical bead on the other part.

In this case the portioning cylinder is rigidly fitted to the shaft which is journalled in the main body 1.

The machine hereinbefore described with respect to Figs. 1 to 5 inclusive operates in the following manner:

The material or dough filled into the hopper is taken up by the portioning cylinder and the portioning chambers are filled whilst the ring-sections 4 recede into the cylinder partly by their own gravity and partly under the pressure of the dough or other material. When passing through the contracted part of the hopper, these chambers are fully filled with dough and the surplus is stripped off by the inner edge of the plate 11. When, upon further rotation of the cylinder 2 the cams 8 lift the rollers 9, the ring-sections 4 will be moved outwards again and the portions of dough either drop therefrom or, if they adhere to said sections, are stripped off along blade 12 and then drop onto the belt conveyor travelling over roller 13.

In the machine according to Figs. 5–8 the dough is carried along by means of the ring-sections 4 which have been forced by the action of the rollers 9 and guide rail 19, into the mouth formed by the plate 11 and portioned off on the wall 17. As soon as the ring-sections 4 emerge from the mouth formed by said plate 11 they are by the action of the rollers 9 and the guide rails 14 withdrawn into the cylinder 2, whereupon the portions either drop onto the belt conveyor by their weight, or, if necessary are stripped off by the stripper blade 12. In all instances, the portioning chambers, because of the plate 11 or its equivalent, communicate with the exterior of the hopper only after communication between said chambers and the interior of said hopper has been cut off. This prevents the dough or other material from being forced out of said chambers by the weight of the material remaining in the hopper or from being forced back into the hopper by the action of the ring-sections 4, as might be the case if such chambers communicated coincidentally with the interior and exterior of the hopper. As a result of the herein described and illustrated arrangement, the dough or other material is accurately and uniformly measured in the desired quantities.

I claim:

1. Machine for portioning off doughy or granular material comprising a hopper, a portioning cylinder revolving in the mouth of said hopper, the shell of said portioning cylinder consisting of fixed ring-sections and ring-sections movably fitted between said fixed ring-sections, said movable ring-sections pivoted at one end to said fixed ring-sections and forming the bottoms of the portioning chambers, means for raising and lowering said movable ring-sections and means whereby concurrent communication between the interior of said hopper and individual chambers and between the latter and the exterior of said hopper is prevented.

2. Machine for portioning off doughy or granular material comprising a hopper, a portioning cylinder revolving in the mouth of said hopper, the shell of said portioning cylinder consisting of fixed ring-sections and ring-sections movably fitted between said fixed ring-sections, said movable ring-sections pivoted at one end to said fixed ring-sections and forming the bottoms of the portioning chambers, rollers coupled to said movable ring sections, a camming device on which said rollers ride to actuate said movable ring-sections, and a plate carried by said hopper and extending peripherally of said cylinder to close successive chambers and thereby prevent concurrent communication between the interior of said hopper and said chambers and between the latter and the exterior of said hopper.

3. Machine for portioning off doughy or granular material comprising a hopper, a portioning cylinder revolving in the mouth of said hopper, the shell of said portioning cylinder consisting of fixed ring-sections and ring-sections movably fitted between said fixed ring-sections, said movable ring-sections pivoted at one end to said fixed ring-sections and forming the bottoms of the portioning chambers, rollers coupled to said movable ring-sections, a camming device on which said rollers ride to actuate said movable ring sections, a conical, axially shiftable sleeve on which said rollers also ride said sleeve being adapted to adjust the capacity of said chambers and a plate carried by said hopper and extending peripherally of said cylinder to close successive chambers and thereby prevent concurrent communication between the interior of said hopper and said chambers and between the latter and the exterior of said hopper.

4. A machine for portioning off dough or granular material comprising a hopper, a portioning cylinder revolving in the mouth of said hopper and comprising fixed ring-sections and ring-sections movably fitted between said fixed ring-sections, said movable ring-sections being pivoted at one end to said fixed ring-sections and forming the bottoms of portioning chambers, rollers coupled to said movable ring-sections, a camming device co-operating with said rollers to actuate said movable ring-sections, a closing roller adjacent to said cylinder whereby material is forced into said chambers and a plate located beyond said roller and adapted in combination therewith to close successive chambers and thereby prevent concurrent communication between the interior of said hopper and individual chambers and between the latter and the exterior of said hopper.

In testimony whereof I have hereunto set my signature in the presence of two subscribing witnesses.

PETER BLUM.

Witnesses:
PAUL FRICARICH,
HERMANN FRICARICH.